US 8,121,596 B1

(12) United States Patent
Shetty et al.

(10) Patent No.: US 8,121,596 B1
(45) Date of Patent: Feb. 21, 2012

(54) SELECTIVE SCANNING OF THE ACTIVE SET

(75) Inventors: Manoj Shetty, Overland Park, KS (US);
Sachin R. Vargantwar, Overland Park, KS (US); Bhagwan Khanka, Lenexa, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 146 days.

(21) Appl. No.: 12/724,650

(22) Filed: Mar. 16, 2010

(51) Int. Cl.
*H04W 8/00* (2009.01)
(52) U.S. Cl. ............... 455/434; 455/418; 455/552.1; 455/452.1
(58) Field of Classification Search .......... 455/418, 455/434, 466, 552.1, 414.1, 452.1
See application file for complete search history.

(56) References Cited

U.S. PATENT DOCUMENTS

| | | | |
|---|---|---|---|
| 5,577,022 A | 11/1996 | Padovani et al. | |
| 5,999,522 A | 12/1999 | Rohani | |
| 2010/0099393 A1* | 4/2010 | Brisebois et al. | 455/418 |
| 2010/0151858 A1* | 6/2010 | Brisebois et al. | 455/434 |

OTHER PUBLICATIONS

Unpublished U.S. Appl. No. 12/725,294, filed Mar. 16, 2010 entitled "Uniform Reverse-Link Power Control for an Active Set of a Mobile Station".
Unpublished U.S. Appl. No. 12/605,457, filed Oct. 26, 2009 entitled "Intelligent Power Control in a Wireless Network".
Unpublished U.S. Appl. No. 12/165,748, filed Jul. 1, 2008 entitled "Method and System for Optimizing Handoff Performance".
Unpublished U.S. Appl. No. 121725,758, filed Mar. 17, 2010 entitled "Determination of Initial Transmit Power Based on Shared Transmit-Power Information".

* cited by examiner

*Primary Examiner* — Phuoc Doan (57) ABSTRACT

Exemplary methods and systems are disclosed that may help a mobile station to conserve power by reducing the number of active sectors being scanned in certain scenarios. An exemplary method involves a mobile station (a) initially operating in a first scanning mode, wherein operation in the first scanning mode comprises the mobile station scanning all sectors in an active set comprising a plurality of sectors; (b) determining signal strength of each sector in the active set; (c) selecting, from the active set, one or more transparent sectors having the lowest signal strengths relative to the other sectors in the active set; and (d) operating in a second scanning mode, wherein operation in the second scanning mode comprises the mobile station scanning a subset of the sectors in the active set, wherein the subset excludes the one or more transparent sectors.

20 Claims, 4 Drawing Sheets

SELECTIVE SCANNING OF THE ACTIVE SET

BACKGROUND

Many people use mobile stations, such as cell phones and personal digital assistants (PDAs), to communicate with cellular wireless networks. These mobile stations and networks typically communicate with each other over a radio frequency (RF) air interface according to a wireless communication protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." These networks typically provide communication services such as voice, Short Message Service (SMS) messaging, and packet-data communication.

Mobile stations typically conduct these wireless communications with one or more base transceiver stations (BTSs), each of which send communications to and receive communications from mobile stations over the air interface. Each BTS is in turn communicatively connected with an entity known as a base station controller (BSC), which (a) controls one or more BTSs and (b) acts as a conduit between the BTS(s) and one or more switches or gateways, such as a mobile switching center (MSC) and/or packet data serving node (PDSN), which may in turn interface with one or more signaling and/or transport networks.

As such, mobile stations can typically communicate with one or more endpoints over the one or more signaling and/or transport networks from inside one or more coverage areas (such as cells and/or sectors) of one or more BTSs, via the BTS(s), a BSC, and an MSC and/or PDSN. In typical arrangements, MSCs interface with the public switched telephone network (PSTN), while PDSNs interface with one or more core packet-data networks and/or the Internet.

In some wireless communication systems or markets, a wireless service provider may implement more than one type of air interface protocol. For example, a carrier may support one or another version of CDMA, such as EIA/TIA/IS-2000 Rel. 0, A (hereafter "IS-2000") for both circuit-cellular voice and data traffic, as well as a more exclusively packet-data-oriented protocol such as EIA/TIA/IS-856 Rel. 0, A, or other version thereof (hereafter "IS-856"). Mobile stations operating in such systems may be capable of communication with either or both protocols, and may further be capable of handing off between them, in addition to being able to hand off between various configurations of coverage areas.

In CDMA systems, such as those compliant with IS-2000, a mobile station can communicate on a given carrier frequency with a number of "active" sectors concurrently, which collectively make up the mobile station's "active set." Depending on the system, the number of active sectors can be up to six (currently). In practice, the mobile station typically receives largely the same signal from each of its active sectors, and on a frame-by-frame basis, selects the best signal to use.

OVERVIEW

To create its active set, a mobile station typically scans for available pilot signals and populates the active set with sectors having a pilot signal above a threshold level. The active set is maintained in the mobile station's memory, each active sector being identified according to its PN offset. Further, under IS-2000, a mobile station continually scans the pilot signals from its active sectors as well as from other sectors, as the signal strength in each sector may vary as the mobile station moves about within the wireless communication system, or as other factors cause radio frequency (RF) conditions to change. The mobile station then reports the received signal strengths to the serving base station, which in turn directs the mobile station to update its active set in accordance with the reported strengths and one or more threshold conditions.

The more sectors in the active set, the longer the mobile station spends a scanning for the pilot signals from the active set. And when the mobile station spends more time scanning for the pilot signals, the mobile stations uses more battery power. Moreover, scanning a larger active set may require a more complex search engine; and the complexity of the search engine may result in even greater use of battery power. Furthermore, an increase in the time spent scanning may also result in increased hand-off delay. Accordingly, exemplary methods and systems may help a mobile station save power by selecting and scanning only a subset of the sectors from the active set. Those sectors in the active set, which are not scanned in certain scenarios, may be referred to as "transparent" sectors.

In one aspect, an exemplary method involves (a) a mobile station initially operating in a first scanning mode, wherein operation in the first scanning mode comprises the mobile station scanning all sectors in an active set comprising a plurality of sectors; (b) the mobile station determining signal strength of each sector in the active set; (c) the mobile station selecting, from the active set, one or more transparent sectors having the lowest signal strengths relative to the other sectors in the active set; and (d) the mobile station operating in a second scanning mode, wherein operation in the second scanning mode comprises the mobile station scanning a subset of the sectors in the active set, wherein the subset excludes the one or more transparent sectors. Further, while the mobile station is operating in the second scanning mode, the mobile station may detect a call-drop risk, and in response switch back to the first scanning mode to again scan all sectors in the active set.

In another aspect, an exemplary system includes (i) a tangible computer readable medium; and (ii) program instructions stored in the tangible computer readable medium that are executable by at least one processor to: (a) cause a mobile station to operate in a first scanning mode, wherein the mobile station scans all sectors in an active set while in the first scanning mode; (b) determine signal strength of each sector in the active set; (c) select, from the active set, one or more transparent sectors having the lowest signal strengths relative to the other sectors in the active set; and (d) cause a mobile station to operate in a second scanning mode, wherein the mobile station scans a subset of the sectors in the active set while in the first scanning mode, wherein the subset excludes the one or more transparent sectors.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

I. Exemplary Network Architecture and Functionality

Exemplary embodiments of the present invention are described herein. It should be understood that the word "exemplary" is used herein to mean "serving as an example, instance, or illustration." Any embodiment described herein as "exemplary" is not necessarily to be construed as preferred or advantageous over other embodiments. Further, those skilled in the art will understand that changes and modifications may be made to these embodiments without departing from the true scope and spirit of the invention, which is defined by the claims.

Figure 1:
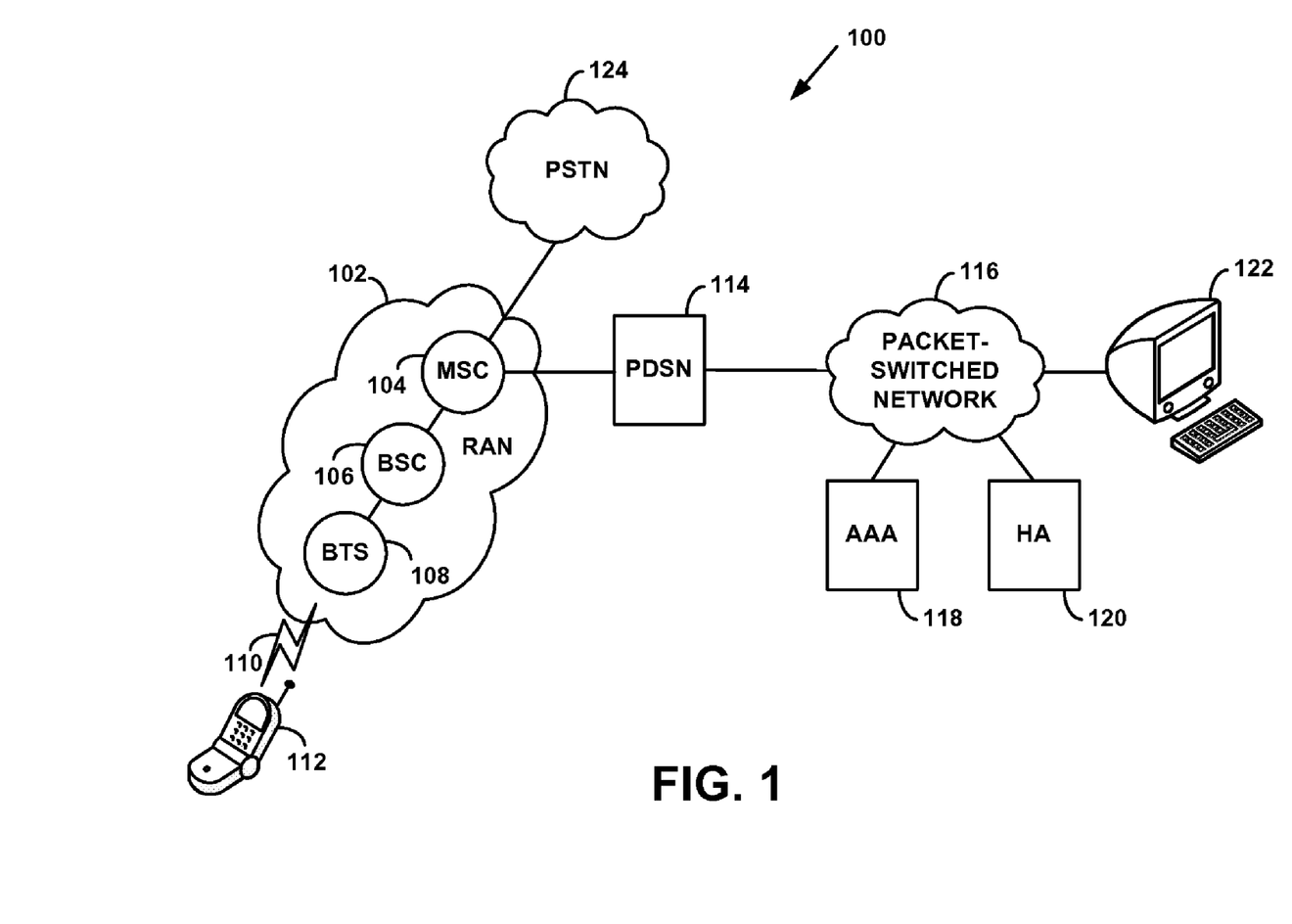
FIG. 1 is a simplified block diagram of a wireless communication system in which an exemplary embodiment may be implemented.

Referring to the drawings, FIG. 1 is a simplified block diagram of a wireless communication system 100 in which an exemplary embodiment may be implemented. In such a wireless communication system, a wireless carrier typically operates a radio access network (RAN) 102, which is controlled by a switching entity such as a mobile switching center (MSC) 104. The MSC generally includes or connects with one or more base station controllers (BSCs) 106, which in turn connect with one or more base transceiver stations (BTSs) 108. Each BTS 108 conventionally includes a cell tower with one or more antennas that communicate with mobile stations 112, 113, 115 via an air interface 110.

Communications between the RAN 102 and mobile stations 112, 113, 115 may occur in accordance with any air interface protocol now known or later developed. Examples of such protocols include CDMA (e.g., 1xRTT, 1xEV-DO), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, and infrared. Other protocols may also be employed.

With the illustrated configuration, RAN 102 may provide service in an area that is divided geographically into a number of cells, each defined by a radio frequency (RF) radiation pattern from a BTS 108. Furthermore, each cell may be subdivided into a number of sectors. For simplicity, references to a "sector" herein should be understood to include sectors, cells, and possibly other types of coverage areas as well. In general, air interface communications in each sector (or other such coverage area) of a cellular wireless communication system can be encoded or carried in a manner that distinguishes the communications in that sector from communications in adjacent sectors. For example, in a Code Division Multiple Access (CDMA) system, each sector has a respective pseudo-random noise offset or "PN offset" that is used to encode or modulate air interface communications in the sector distinctly from those in adjacent sectors. Analogously, in other air interface protocols, communications in one sector may be distinguished from those in other sectors by frequency, time, and/or various other parameters.

Further, air interface communications between mobile station 112 and BTS 108 may be classified as forward link communications, which are those passing from BTS 108 to the mobile station 112, and reverse link communications, which are those passing from mobile station 112 to BTS 108. In an IS-2000 system, both the forward link and reverse link communications in a given wireless service sector are encoded by the sector's PN offset and a given Walsh code. On the forward link, certain Walsh codes are reserved for use to define control channels, including a pilot channel, a sync channel, and one or more paging channels, and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

BTS 108 may be any network element arranged to carry out the BTS functions described herein. As such, BTS 108 may include a communication interface, a processor, and data storage comprising instructions executable by the processor to carry out those BTS functions. The communication interface may include one or more antennas, chipsets, and/or other components for providing one or more CDMA coverage areas such as cells and sectors, for communicating with mobile stations such as mobile station 112 over an air interface. The communication interface may also include one or more wired (e.g. Ethernet) and/or wireless (e.g. WiFi or WiMax) interfaces for communicating with at least BSC 106. [6953]

BSC 106 may be any network element arranged to carry out the BSC functions described herein. As such, BSC 106 may include a communication interface, a processor, and data storage comprising instructions executable by the processor to carry out those BSC functions. The communication interface may include one or more wired (e.g. Ethernet) and/or wireless (e.g. WiFi or WiMax) interfaces for communicating with at least BTS 108, and mobile switching center (MSC) 104.

As shown, BSC 106 may function to control one or more BTSs such as BTS 104, and to provide those one or more BTSs with connections to switches such as MSC 104 or packet-data serving node (PDSN) 114, for instance. PDSN 114 in turn provides connectivity with a packet-switched network 116, such as the Internet and/or a wireless carrier's private core packet-network. Sitting as nodes on network 116 are, by way of example, an authentication, authorization, and accounting (AAA) server 118, a mobile-IP home agent (HA) 120, and a remote computer 122. After acquiring an air traffic channel over its air interface, a mobile station (e.g., mobile station 112) may send a request to PDSN 116 for a connection in the packet data network. Then, following authentication of the mobile station by AAA server 118, the mobile station may be assigned an IP address by the PDSN or by HA 120, and may thereafter engage in packet-data communications with entities such as remote computer 122.

MSC 104 may be any networking element arranged to carry out the switch functions described herein. Thus, MSC 104 may include a communication interface, a processor, and data storage comprising instructions executable by the processor to carry out those switch functions. The communication interface may include one or more wired (e.g. Ethernet) and/or wireless (e.g. WiFi or WiMax) interfaces for communicating with at least BSC 106 and a public-switched telephone network (PSTN) 124.

Note that the combination of BTS 108 and BSC 106 may be considered a "base station." However, BTS 108 or BSC 106 could, taken alone, each be considered a base station as well. Furthermore, a base station may be considered to be either or both of those devices, and perhaps make use of one or more functions provided by MSC 104, and/or other network entities.

In a further aspect, RAN 102 may be configured to engage in reverse-link power control with mobile station 112. In general, the higher the frame error rate (FER), the lower the quality of service will be, and vice versa. The FER is thus an indicator of the RF conditions of the reverse link, and consequently the quality service provided over the respective link. Typically, the higher the transmission power on the link (forward or reverse), the lower the FER will be. Accordingly, a base station (i.e., BTS 108 and/or BSC 106) may compute the FER on the reverse-link and, as appropriate, send control messages indicating that mobile station 112 should increase its transmit power (e.g., a power-up message) or decrease its transmit power (e.g., a power-down message). For example, a base station may be configured to compute the FER equal to the ratio of (i) the number of error-containing frames received during a given period of time to (ii) the total number of frames received during the same period of time, and to responsively send control messages. More generally, reverse-link power-control techniques typically involve the base station evaluating signal strength and/or FER on the reverse link, and sending control messages when necessary. However, it should be understood that any form of reverse-link power control may be employed, without departing from the scope of the invention.

In a CDMA system, a base station may use three different control loops to control reverse-link transmission power. The first loop is referred to as "open loop" control, and is based on the level of power received in the total 1.25 MHz physical channel bandwidth. The second loop is referred to as the "closed" loop, and involves the base station measuring signal strength on the reverse traffic channels to determine if the reverse-link power at the desired level. Then, if reverse-link power is not at the desired level, the base station transmits a one-bit control message (i.e., a power-up or power-down message) to the mobile station at a rate of up to 800 bits/sec on the forward traffic channel. These power-up and power-down message typically adjust the mobile transmit power (i.e., reverse-link power) in steps of approximately 1 dB. The third loop is referred to as the "outer" loop, and involves the base station using reverse-link frame quality statistics (e.g., FER) to monitor the efficacy of the closed loop control. If the FER is above a desired level, the base station uses closed loop power control to instruct the mobile station to increase its transmit power (e.g., by transmitting a power-up message).

It should be understood that the depiction of just one of each network element in FIG. 1 is illustrative, and there could be more than one of any of them, as well as other types of elements not shown. The particular arrangement shown in FIG. 1 should not be viewed as limiting with respect to the present invention. Further, the network components that make up a wireless communication system such as system 100 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein.

Referring now to mobile station 112, it may be any mobile device arranged to carry out the mobile-station functions described herein. As examples, mobile station 112 could be or include a cell phone, a PDA, a computer, a laptop computer, a hybrid CDMA/EV-DO device, and/or a multi-mode cellular/Wi-Fi device. As such, a mobile station may include a user interface, a wireless-communication interface, a processor, and data storage comprising instructions executable by the processor for carrying out those mobile-station functions. The user interface may include buttons, a touchscreen, a microphone, and/or any other elements for receiving inputs, as well as a speaker, one or more displays, and/or any other elements for communicating outputs. Further, while the term "mobile station" is a term of art commonly used for such devices, the term "mobile station" should be understood to include non-mobile devices, such as a personal computer or any other device capable of the functionality of a mobile station described herein.

In an exemplary embodiment, mobile station 112 may be configured to maintain an "active set" of sectors available to the mobile station. For example, under IS-2000, the base station provides the mobile station the following parameters that relate to pilot signal strength:

T_ADD: Threshold pilot strength for addition to the active set (e.g., −14 dB)

T_COMP: Difference in signal strength from an active set pilot (e.g., 2 dB)

T_DROP: Threshold pilot strength for removal from the active set (e.g., −16 dB)

T_TDROP: Time for which an active set pilot falls below T_DROP to justify removal from the active set (e.g., 2 seconds)

The base station also provides the mobile station with a Neighbor List Update Message (NLUM), which identifies the "neighbor" sectors, which are not in the active set, but are identified as candidates for the active set.

The mobile station 112 then scans for all of the pilot signals from the sectors in its active set and measures the received signal strength for each. For example, mobile station 112 may calculate $E_c/I_o$ for each sector in the active set, where $E_c$ is energy per chip and $I_o$ is the total power received. If the pilot signal strength of any neighbor sector exceeds T_ADD, the mobile station 112 adds the pilot to its "candidate" set and sends a Pilot Strength Measurement Message (PSMM) to the base station with the estimated $E_c/I_o$ for the pilot and information indicative of the identity of the sector. If the pilot strength exceeds any active sector signal by T_COMP, and depending on current capacity and other issues, the base station may then send a Handoff Direction Message (HDM) to the mobile station, listing the pilot as a new member of the active set. Upon receipt of the HDM, the mobile station 112 then adds the pilot to its active set as instructed, and the mobile station sends a Handoff Completion Message (HCM) to the base station (e.g., to BTS 108), acknowledging the instruction, and providing a list of the pilots (PN offsets) in its active set. Depending on system configuration, the mobile station may also identify pilot signals from the remaining set of sectors if they exceed the thresholds.

Similarly, if the mobile station 112 detects that the signal strength of a pilot in its active set drops below T_DROP, the mobile station starts a handoff drop timer. If T_TDROP passes, the mobile station then sends a PSMM to the base station, indicating the $E_c/I_o$ and drop timer. The base station may then respond by sending an HDM to the mobile station, without the pilot in the active set. The mobile station would then receive the HDM and responsively move the pilot to its neighbor set and send an HCM to the base station.

When the mobile station 112 is engaged in IS-2000 communications, mobile station 112 decodes transmissions using all the PN offsets in its active set, together with the respective Walsh codes assigned for each PN-identified sector. Then, on a frame-by-frame basis, the mobile station may select a sector from its active set from which to receive forward-link traffic.

II. Exemplary Systems

Figure 2:
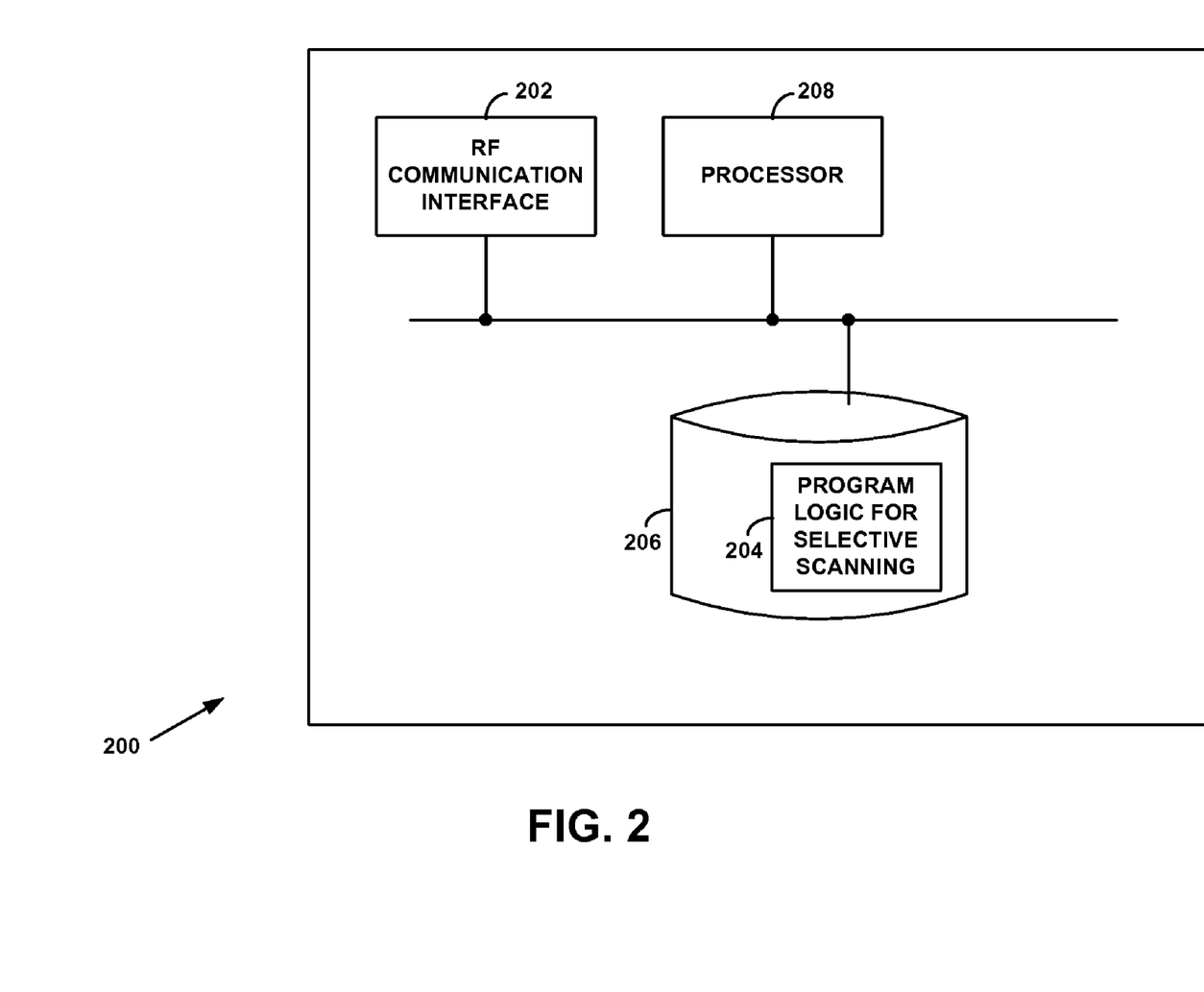
FIG. 2 is a block diagram illustrating a system according to an exemplary embodiment.

FIG. 2 is a block diagram illustrating a system according to an exemplary embodiment. An exemplary system may take the form of a mobile station, may be a component of a mobile station, or may be a standalone system in communication with a mobile station. For purposes of example in FIG. 2, the exemplary system takes the form of a mobile station 200. By way of example, mobile station 200 may be a cell phone, wirelessly equipped personal digital assistant (PDA), or any other type of wirelessly-equipped device now known or later developed. Further, it should be understood that while the term "mobile station" is a term of art commonly used for devices that are capable of wireless communications, the term "mobile station" should be understood to include non-mobile devices, such as a personal computer or any other device capable of the functionality of a mobile station described herein.

The mobile station 200 is preferably equipped with hardware, software, and/or other logic to communicate with a RAN in accordance with an agreed communication protocol, such as one of the protocols noted herein for instance. For example, mobile station 200 may include a radio frequency (RF) communication interface 202 that functions to facilitate air interface communications with a RAN according to one or more protocols such as those noted above. More generally, the communication interface 202 may be able to communicate with one or more of various types of networks and devices, such as CDMA networks, Wi-Fi networks, WiMAX networks, Bluetooth devices, and/or one or more additional types of networks and devices.

Mobile station 200 may also include program logic 204 stored in data storage 206 (e.g., one or more volatile and/or non-volatile storage components of the mobile station, such as magnetic, optical, or organic storage components) and executable by one or more processors 208 (e.g., general purpose and/or special purpose processors) to carry out the various mobile-station functions described herein, which include, but are not limited to, the exemplary methods described herein. In general, the processor 208 and data storage 206 may be any suitable components known to those of skill in the art.

According to an exemplary embodiment, mobile station 200 is preferably configured to maintain an active set of sectors as described herein, and to engage in selective scanning of its active set. In particular, mobile station 200 may be configured to operate in at least a first scanning mode and a second scanning mode. In the first scanning mode, the mobile station scans all sectors in its active set, but in the second scanning mode, the mobile station scans a subset of the active set, excluding selected "transparent" sectors.

Transparent sectors may be selected from the active set using various techniques. Preferably, the mobile station 200 is configured to determine signal strength of each sector in the active set (i.e., the strength of the pilot signal), and to select as transparent sectors, the one or more sectors in the active set having the lowest signal strengths relative to the other sectors in the active set. For example, the mobile station may scan the active set and determine Ec/Io for each sector in the active set. The mobile station 200 may then identify a predetermined number of sectors as transparent sectors, which are to be excluded from scanning in the second scanning mode. As one example, the mobile station 200 may select one sector with the lowest Ec/Io as the lone transparent sector to be excluded from scanning. Thus, if the active set includes six sectors, for instance, the mobile station will scan only the five sectors having the five highest Ec/Io values. Alternatively, the mobile station 200 may select multiple transparent sectors (two or three sectors for instance), which have the lowest Ec/Io values (i.e., the two or three lowest Ec/Io values in the active set).

In an exemplary embodiment, the mobile station 200 may default to the first scanning mode, and only switch to the second scanning mode in certain scenarios. For example, the mobile station may switch to the second scanning mode when the mobile station 200 detects that its battery power has dropped below a threshold level. This threshold may be selected as a matter of engineering design choice. As another example, a mobile station may detect when it substantially stationary, such as by periodically using GPS to determine its location or detecting when it has been communicating via the same sector for a predetermined time, and responsively switch to the second scanning mode in order to conserve power. It should be understood, however, that in alternative embodiments, the mobile station 200 may not default to the first scanning mode, and may switch between the first and second scanning modes for any reason, without departing from the scope of the invention.

In a further aspect, mobile station 200 may select transparent sectors on an as-needed basis, or may routinely select transparent sectors. More specifically, mobile station 200 may wait until it is about to switch to the second scanning mode to select transparent sectors, or alternatively, may regularly identify and update its transparent sectors. In the latter scenario, the mobile station my periodically identify and store a record of its transparent sector or sectors while operating in the first scanning mode, but continue scanning the transparent sectors until it switches to the second scanning mode.

The mobile station 200 may further be configured to switch back to the first scanning mode from the second scanning mode in various scenarios. For example, the mobile station 200 may switch back to the first scanning mode when it detects that its battery has been recharged to above a threshold level. More generally, the mobile station 200 may switch back to the first scanning mode whenever the condition that triggered the switch to the second scanning mode no longer exists.

Furthermore, the mobile station 200 may switch back to the first scanning mode when it detects a risk that a call will be dropped. For example, if the mobile station determines that the signal strength of a predetermined number of the sectors from the subset of the active set that is still being scanned, has dropped below a threshold level, this may be interpreted as a call-drop risk. Accordingly, the mobile station may respond by switching back to the first scanning mode. As another example, a mobile station 200 may interpret the receipt of a predetermined number of power-up messages (either in one sector or cumulatively from a number of sectors) as a call-drop risk, and responsively switch back to the first scanning mode. Other examples are also possible.

III. Exemplary Methods

Figure 3:
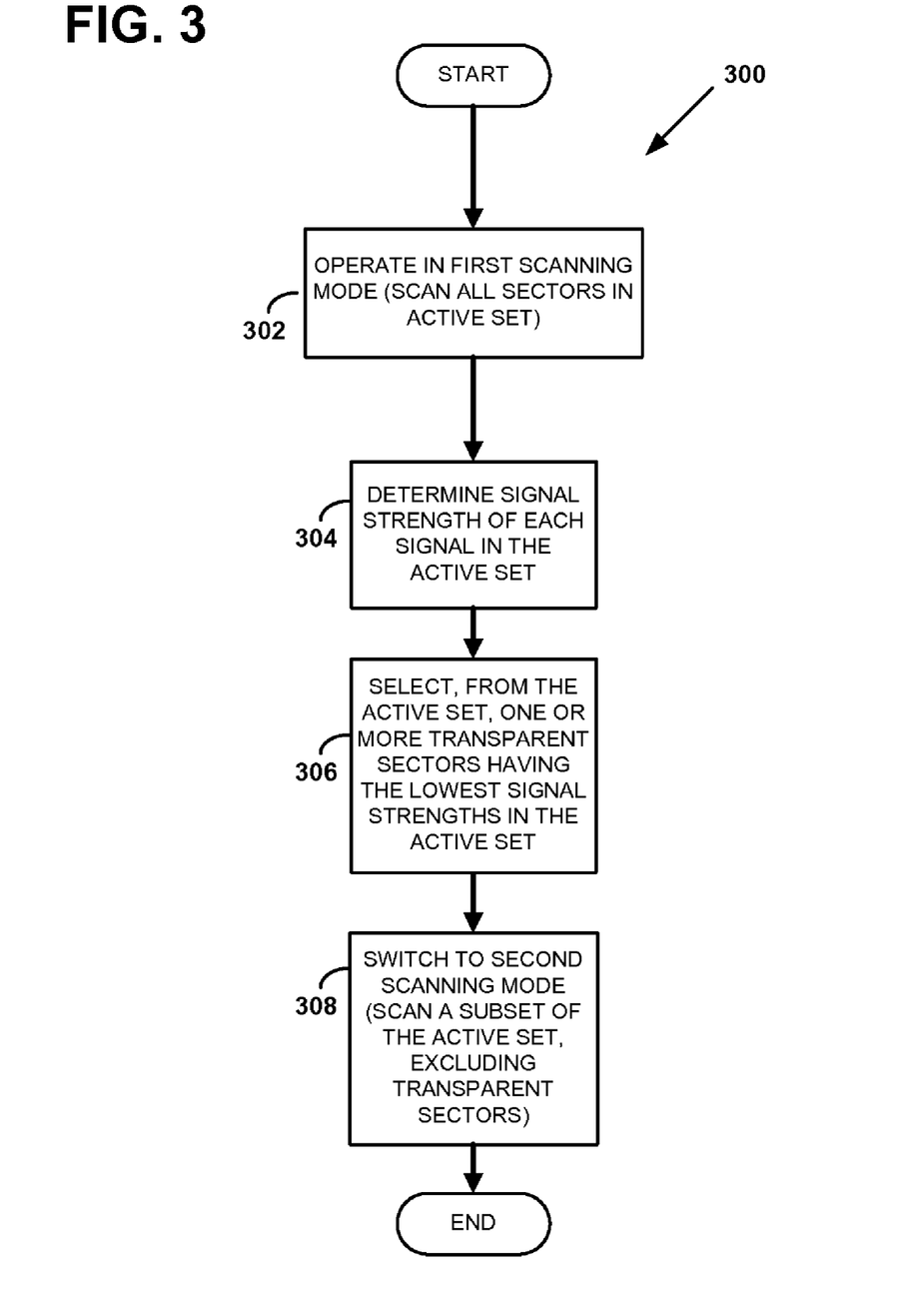
FIG. 3 is a flow chart illustrating a method according to an exemplary embodiment.

FIG. 3 is a flow chart illustrating a method 300 according to an exemplary embodiment. Exemplary methods, such as method 300, are preferably carried out by a mobile station, or a system within or associated with the mobile station, in order to switch between scanning modes to intelligently reduce the number of sectors being scanned by the mobile station.

The method 300 involves the mobile station initially operating in a first scanning mode, as shown by block 302. In the first scanning mode, the mobile station scans all sectors in its active set. The mobile station then determines the signal strength of each sector in the active set, as shown by block 304. Next, the mobile station selects, from the active set, one or more transparent sectors having the lowest signal strengths relative to the other sectors in the active set, as shown by block 306. The mobile station then switches to operating in a second scanning mode, as shown by block 308. In the second scanning mode, the mobile station scans a subset of the sectors in the active set, which excludes the one or more transparent sectors.

As noted, operating in the second scanning mode may involve scanning only a subset of the sectors in the active set. More specifically, while in the first scanning mode, the mobile station may scan all active sectors, such as by scanning according to IS-2000. To do so, a mobile station may scan three active sectors A1-A3, a candidate sector C1, and neighbor sectors N1-N2 in a manner such that active sectors are scanned twice as often as candidate sectors, and candidate sectors are scanned twice as often as neighbor sectors. For instance, may repeatedly scan sectors A1-A3, C1, and N1-N2 in the following order: A1, A2, A3, C1, A1, A2, A3, N1, A1, A2, A3, C1, A1, A2, A3, N2. If sector A2 is selected as a transparent sector, when the mobile station switches to the second scanning mode, the mobile station may then pause or rest (i.e., refrain from scanning) when it would have previously scanned sector A2. Accordingly, in the second scanning mode, the mobile station may repeatedly scan sectors A1, A3, C1, and N1-N2 in the following order: A1, pause, A3, C1, A1, pause, A3, N1, A1, pause, A3, C1, A1, pause, A3, N2. Other sequences and scanning techniques are also possible.

In an alternative embodiment, the mobile station may conserve power by reducing the frequency with which it scans transparent sectors, rather than removing them from scanning altogether. For example, referring again to a mobile station having three active sectors A1-A3, a candidate sector C1, and neighbor sectors N1-N2, the mobile station may determine A2 is a transparent sector and cut the frequency with which it scans A2 in half, repeatedly scanning sectors A1-A3, C1, and N1-N2 in the following order: A1, pause, A3, C1, A1, A2, A3, N1, A1, pause, A3, C1, A1, A2, A3, N2. It should be understood that the order in which sectors are scanned, and the reduced frequency with which a transparent sector is scanned, may vary as a matter of engineering design choice.

In method 300, the signal strength of each sector is preferably determined by calculating $E_c/I_o$ for the sector. $E_c/I_o$ is a measure of the energy of a particular forward-link signal as compared to the energy of all signals perceived by the mobile station. Thus, $E_c/I_o$ may vary according to the ratio of the power of a signal having the PN offset for a certain sector (i.e., the energy $E_c$ associated with the particular PN code) as compared to the total power of all signals being received by the mobile station (i.e., the total energy including and the energy $E_c$ associated with the PN codes from other sectors, as well as the energy $E_{other}$ at the mobile station from all other sources including noise, etc.). In practice, $E_c/I_o$ is typically determined as $E_c/I_o=10*\log(E_c/(E_c+E_{other}))$. It should be understood, however, that signal strength may be determined using other techniques, without departing from the scope of the invention.

In a further aspect, an exemplary method may involve detecting certain events or conditions that trigger the mobile station to perform method 300 in order to switch to the second scanning mode. For example, the mobile station may monitor its battery level, and may switch to the second scanning mode, such as by carrying out blocks 304-308, in response to a determination that a mobile-station battery level is below a threshold level, a determination that a mobile station is substantially stationary, or in any other scenario where the mobile station can advantageously reduce power consumption by switching to the second scanning mode.

In a further aspect (not shown), while operating in the second scanning mode, the mobile station may transmit a Pilot Strength Measurement Message (PSMM) that excludes the transparent sectors, and thus only identifies the subset of the sectors in the active set. Excluding the transparent sectors may be preferable since transparent sectors are not scanned, which in turn means that the mobile station does not have a current pilot signal from which to determine signal strength. Alternatively, the mobile station may identify the transparent sectors, and simply include the last-known pilot signal strength for each transparent sector. As another alternative, the mobile station include the last-known pilot signal strength for each transparent sector in PSMMs until the last-known signal strengths are deemed "stale"; after a predetermined period of time has passed since switching to the second scanning mode, for instance. After the last-known signal strengths are deemed stale, the mobile station may remove the transparent sectors from PSMMs, until switching back to the first scanning mode.

Figure 4:
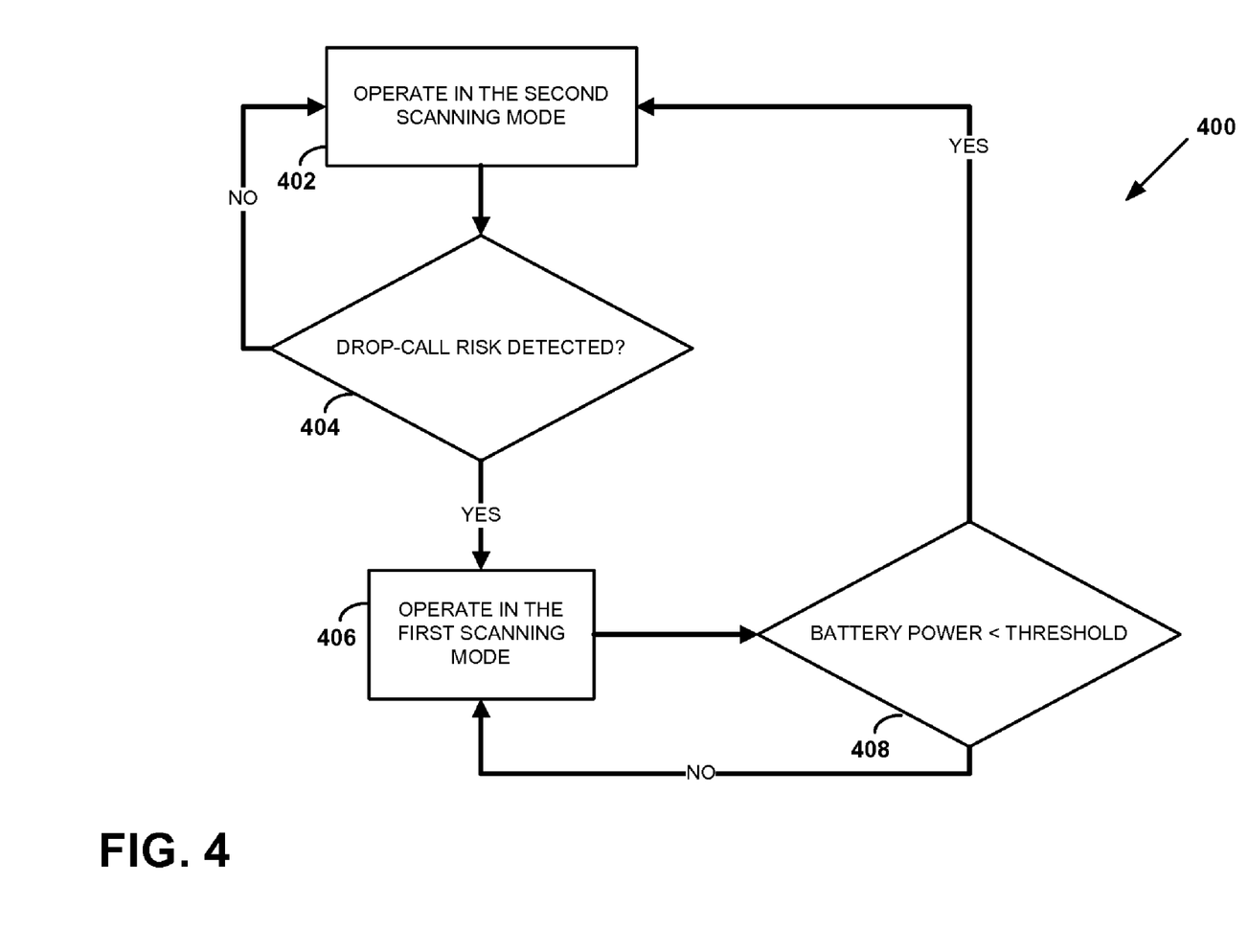
FIG. 4 is another flow chart illustrating a method according to an exemplary embodiment.

FIG. 4 is another flow chart illustrating a method 400 according to an exemplary embodiment. In method 400, the mobile station is initially operating in the second scanning mode (and thus is scanning only a subset of the active set, excluding transparent sectors), as shown by block 402. (The mobile station may have previously switched from the first scanning mode to the second scanning mode, such as by carrying out method 300.) While the mobile station is operating in the second scanning mode, the mobile station detects a call-drop risk, as shown by block 404. In response to the call-drop risk, the mobile station switches back to the first scanning mode, as shown by block 406. Once back in the first scanning mode, the mobile station returns to scanning all sectors in the active set. Operation in the first scanning mode may then continue until a triggering event occurs, such as battery power falling below a predetermined threshold, as shown in block 408. Upon such an occurrence, the mobile station may again switch to operating in the second scanning mode, as shown in block 402.

The step of detecting a call-drop risk may be accomplished using various techniques. For example, the mobile station may determine the signal strength for all the sectors in the subset of the active set (which the mobile station is scanning), and then determine whether or not the combined signal strength of a predetermined number of the sectors in the subset is below a threshold. If the combined signal strength is below a combined-signal-strength threshold, then the mobile station may switch back to the first scanning mode, and again scan all sectors in the active set. Alternatively, the mobile station may consider the signal strength of each sector individually, and switch back to the first scanning mode if a predetermined number of the sectors in the subset each have a signal strength below a predetermined threshold. In either case, doing so may help prevent a dropped call, as the low signal strengths may be an indication of poor quality-of-service in the sectors being scanned, and resuming scanning of all sectors may allow for a handoff to the transparent sectors, in which the signal strength may have increased since switching to the second scanning mode.

As another example, step of detecting a call-drop risk may involve the mobile station tracking how many power-up messages are received after switching to the second scanning mode (or possibly during another predetermined period of time). The mobile station may track the power-up messages on a per-sector basis (i.e., totaling the number received from each sector), or cumulatively (i.e., totaling the number of messages received from all sectors). In either case, if a predetermined number of power-up messages are received, the mobile station may interpret this as a call-drop risk. Accordingly, the mobile station may respond by switching back to the first scanning mode.

In a further aspect, method 400 may involve, the mobile station switching back to the second scanning mode from the first scanning mode. In particular, the mobile station may detect that the battery power dropped below a predetermined threshold, and again switch to the second scanning mode, as shown by block 408. This threshold may be set at a lower battery level, than the threshold that triggered the initial switch to the second scanning mode (e.g., such as the threshold level that triggered the initial performance of method 300, prior to step 402). It should be understood that other conditions may also trigger the mobile station switching back to the second scanning mode, such as the worsening of the conditions that initially triggered the switch to the second scanning mode, for instance.

It should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

We claim:

1. A method comprising:
   (a) a mobile station initially operating in a first scanning mode, wherein operation in the first scanning mode comprises the mobile station scanning all sectors in an active set comprising a plurality of sectors;
   (b) the mobile station determining signal strength of each sector in the active set;
   (c) the mobile station selecting, from the active set, one or more transparent sectors having the lowest signal strengths relative to the other sectors in the active set; and
   (d) the mobile station operating in a second scanning mode, wherein operation in the second scanning mode comprises the mobile station scanning a subset of the sectors in the active set, wherein the subset excludes the one or more transparent sectors.

2. The method of claim 1, wherein the scanning of one of the sectors in the active set comprises searching for a pilot signal from the sector.

3. The method of claim 1, wherein determining the signal strength of each sector in the active set comprises determining Ec/Io for each sector.

4. The method of claim 1, wherein selecting, from the active set, one or more transparent sectors having the lowest signal strengths relative to the other sectors in the active set comprises:
   selecting the sector having the lowest Ec/Io value from the sectors in the active set.

5. The method of claim 1, wherein selecting, from the active set, one or more transparent sectors having the lowest signal strengths relative to the other sectors in the active set comprises:
   selecting a predetermined number of sectors having the lowest Ec/Io values from the sectors in the active set.

6. The method of claim 1, further comprising:
   while the mobile station is operating in the second scanning mode, the mobile station detecting a call-drop risk; and
   in response to detecting the call-drop risk, the mobile station switching to the first scanning mode to scan all sectors in the active set.

7. The method of claim 6, wherein detecting the call-drop risk comprises:
   the mobile station determining signal strength for all the sectors in the subset of the active set; and
   the mobile station determining that the signal strength of a predetermined number of the sectors in the subset is below a threshold.

8. The method of claim 7, wherein determining signal strength for all the sectors in the subset of the active set comprises determining a combined Ec/Io for all the sectors in the subset of the active set.

9. The method of claim 6, wherein detecting the call-drop risk comprises receiving a predetermined number of power-up messages, wherein each of the power-up messages is received from a sector in the radio access network.

10. The method of claim 1, further comprising, while operating in the second scanning mode, transmitting a Pilot Strength Measurement Message (PSMM) that identifies the subset of the sectors in the active set.

11. The method of claim 1, further comprising, the mobile station performing (b)-(d) in response to a determination that a mobile-station battery level is below a threshold level.

12. A system comprising:
    a tangible computer readable medium;
    program instructions stored in the tangible computer readable medium that are executable by at least one processor to:
    (a) cause a mobile station to operate in a first scanning mode, wherein the mobile station scans all sectors in an active set while in the first scanning mode;
    (b) determine signal strength of each sector in the active set;
    (c) select, from the active set, one or more transparent sectors having the lowest signal strengths relative to the other sectors in the active set; and
    (d) cause a mobile station to operate in a second scanning mode, wherein the mobile station scans a subset of the sectors in the active set while in the first scanning mode, wherein the subset excludes the one or more transparent sectors.

13. The system of claim 12, wherein the program instructions stored in the tangible computer readable medium that are executable by the at least one processor to determine the signal strength of each sector in the active set comprise:
    program instructions stored in the tangible computer readable medium that are executable by the at least one processor to determine Ec/Io for each sector.

14. The system of claim 12, wherein the program instructions stored in the tangible computer readable medium that are executable by the at least one processor to select, from the active set, one or more transparent sectors having the lowest signal strengths relative to the other sectors in the active set comprise:
    program instructions stored in the tangible computer readable medium that are executable by the at least one processor to select the sector having the lowest Ec/Io value from the sectors in the active set.

15. The system of claim 12, further comprising program instructions stored in the tangible computer readable medium that are executable by the at least one processor to:
    detect a call-drop risk while the mobile station is in the second scanning mode; and
    in response to the call-drop risk, cause the mobile station to switch to the first scanning mode to scan all sectors in the active set.

16. The system of claim 15, wherein the program instructions stored in the tangible computer readable medium that are executable by the at least one processor to detect the call-drop risk comprise program instructions stored in the tangible computer readable medium that are executable by the at least one processor to:

determine a signal strength for each sector in the subset of the active set; and determine that the signal strength of a predetermined number of the sectors in the subset is below a threshold.

17. The system of claim 15, wherein the call-drop risk comprises receipt of a predetermined number of power-up messages by the mobile station, wherein each of the power-up messages is received from a sector in the radio access network.

18. The system of claim 12, further comprising program instructions stored in the tangible computer readable medium that are executable by the at least one processor to:

determine that a mobile-station battery level is below a threshold level and responsively perform (b)-(d).

19. The system of claim 12, wherein the system is implemented as a chipset.

20. The system of claim 12, wherein the system is implemented in a mobile station.

* * * * *